(12) United States Patent
O'Lenick

(10) Patent No.: US 7,989,648 B1
(45) Date of Patent: Aug. 2, 2011

(54) ESTERS

(75) Inventor: Kevin A. O'Lenick, Dacula, GA (US)

(73) Assignee: Surfatech Corporation, Lawrenceville, GA (US)

( * ) Notice: Subject to any disclaimer, the term of this patent is extended or adjusted under 35 U.S.C. 154(b) by 0 days.

(21) Appl. No.: 12/807,870

(22) Filed: Sep. 16, 2010

(51) Int. Cl.
*A23D 9/00* (2006.01)

(52) U.S. Cl. ....................................... 554/224

(58) Field of Classification Search ............. 554/224
See application file for complete search history.

(56) References Cited

U.S. PATENT DOCUMENTS 7,674,848 B2    3/2010    Lin

FOREIGN PATENT DOCUMENTS

JP         10158477      *    6/1998

OTHER PUBLICATIONS

Unilin Alcohols http://www.bakerhughes.com, 2010.
Unlin Alcohols Tech Data Brochure, 2010.

* cited by examiner

*Primary Examiner* — Deborah D Carr

(57) ABSTRACT

The present invention is directed to an ester that can be used to produce compositions that are soft solids, which comprises an specific solid ester combined with specific liquid esters selected from the group consisting of glyceryl esters, trimethylolpropane esters, and pentaerythritol esters. The compositions containing this ester providing emolliency to the skin by applying the compositions of the present invention. Finally, the invention is also directed to application of sun screen actives, hydroxy acids, antioxidants, flavonoids, tocopherol, vitamins and the like to the skin in gelled form.

11 Claims, No Drawings

ESTERS

FIELD OF THE INVENTION

The present invention is directed to an ester used to produce a gel composition that comprises an specific solid alkyl ester combined with specific liquid esters selected from the group consisting of glyceryl esters, trimethylolpropane esters, and pentaerythritol esters.

The invention is also directed to a process for providing emolliency to the skin by applying the compositions of the present invention, The invention is also directed to application of sun screen actives, hydroxy acids, antioxidants, flavonoids, tocopherol, vitamins and the like to the skin in gelled form.

BACKGROUND OF THE INVENTION

There is a long felt need for gelled products in the personal care market. Gels allow for application to the skin of cosmetically elegant materials that provide benefit to the skin.

One example of the use of gels is the jellification of cyclomethicone with a combination of water and water-soluble dimethicone copolyol materials. The gel is used to deliver antiperspirant actives to the sin in a dry feeling system. Typical of the technology is U.S. Pat. No. 5,623,017, issued Apr. 22, 1997 to Hill, entitled Clear silicone gels describes "a method of forming a thermodynamically stable transparent product by combining (i) water; (ii) a volatile cyclic methyl siloxane or volatile linear methyl siloxane; and (iii) a silicone polyether surfactant." This patent exemplifies the approach that has been taken to make gels of cyclomethicone for use in personal care products. The patent is related to thickening cyclomethicone, not esters with water (which is absent in the present invention), with an ethoxylated silicone. In short the art teaches that there is a long felt need to make gels in the personal care industry.

Those materials that are clear in the solvent generally define the Concept of what is soluble. Sodium Chloride is soluble in water. That is it is clear, but is also uniformly distributed in the solution. Unlike sodium chloride, which makes a uniform concentration solvent, materials that are bipolar are clear in water, but do not have uniform distribution in the solvent. The common example is sodium lauryl sulfate (SLS). SLS has a water-soluble sulfate group and an oil soluble lauryl portion (C12 hydrophobe). When SLS is added to water it is clear and consequently soluble. However, the molecule accumulates at the surface, lowering the surface tension. At a concentration called the CMC (critical micelle concentration) agglomerates form. SLS has an oil soluble and water-soluble group as shown below:

$CH_3(CH_2)_{11}$—$SO_4^-Na^+$

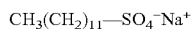

Oil Soluble|Water soluble

We have surprisingly found that in a way analogous to water based systems; ester based systems (oil loving), into which specific fatty esters are introduced are soluble (form clear solutions) but at concentrations above their cmc (critical micelle concentration) form a solid matrix at low concentrations. (a gel), by gel is meant a soft solid material that spreads under pressure.

Compounds useful for gelation of the esters described herein conform to the following structure:

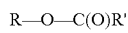

R—O—C(O)R' wherein
R is alkyl having 30 to 50 carbon atoms;
R' is alkyl having 17 to 21 carbon atoms.

The specific compounds of the present invention when added at less than 10% to the specified esters provide a solid spreadable composition that is the topic of the present invention. These materials are buttery in feel and aesthetically appealing on the hair or skin.

The compositions of the present invention are oil soluble esters that are modified to have unique skin spreadability properties. This provides particular value in the personal care arena. Specifically, the ester based structured gels are useful as a carrier in antiperspirants, pigmented products, skin care products, and the like since they spread rapidly and efficiently on the skin from a stiff gel providing emmoliency and a host of ester soluble additives including sun screen actives, hydroxy acids, antioxidants, flavonoids, tocopherol, vitamins and the like. The gels are very cosmetically appealing having a dry feel on the skin and provide a lubricious property which improve the properties of skin creams, skin care lotions, moisturizers, facial treatments such as acne or wrinkle removers, personal and facial cleansers, liquid soaps, bath oils, perfumes, colognes, sachets, sunscreens, pre-shave and after-shave lotions, shaving soaps, and shaving lathers. It can be used in hair shampoos, hair conditioners, hair sprays, mousses, permanents, depilatories, and cuticle coats, to enhance cosmetic elegance.

In cosmetics, the compositions of the present invention will function as a leveling and spreading agent for pigments in make-ups, color cosmetics, foundations, blushes, lipsticks, lip balms, eyeliners, mascaras, oil removers, color cosmetic removers, and powders. It is also useful as a delivery system for oil and water-soluble substances such as vitamins. When incorporated into sticks, other gels, lotions, aerosols, and roll-ons, the compositions of the present invention impart a silky-smooth feeling, an outstanding payout.

THE INVENTION

Objectives of the Invention

The object of present invention is to provide a solid composition comprising an specific solid ester combined with a specific liquid esters selected from the group consisting of glyceryl esters, trimethylolpropane esters, and pentaerythritol esters.

Another objective of the present invention is a process for providing emolliency to the skin by applying the compositions of the present invention, The invention is also directed to application of sunscreen actives, hydroxy acids, antioxidants, flavonoids, tocopherol, vitamins and the like to the skin in gelled form.

Other objectives will become clear as one reads the disclosure.

All temperatures disclosed herein are degrees C, All percentages are percentages by weight.

All patents referred to herein to the extent permitted are incorporated herein by reference.

SUMMARY OF THE INVENTION

The present invention is directed to a soft solid composition comprising (a) a solid ester having a melting point of above 30° C., and (b) a liquid ester selected from the group consisting of glyceryl esters, trimethylolpropane esters an pentaerythritol esters. The liquid esters have melting points of below 25° C.

DETAILED DESCRIPTION OF THE INVENTION

The present invention is directed to a composition comprising a mixture of:

A. an ester conforming to

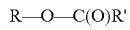

Wherein:
R is alkyl having 30 to 50 carbon atoms;
R' is alkyl having 17 to 21 carbon atoms;
and
B. a liquid ester selected from the group consisting of
 i. glyceryl esters conforming to the following structure;

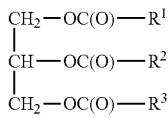

wherein;
 $R^1$, $R^2$, and $R^3$ are independently selected from the group consisting of:
 —$(CH_2)_eCH_3$;
 $CH_3(CH_2)_7CH=CH(CH_2)_7$—;
 $CH_3$—$(CH_2)_4$—$CH=CH$—$CH_2$—$CH=CH$—$(CH_2)_7$—
 and mixtures thereof;
 e is an integer ranging from 5 to 11;
 ii. trimethylolpropane esters conforming to the following structure;

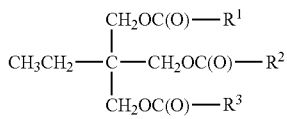

wherein;
 $R^1$, $R^2$ and $R^3$ are independently selected from the group consisting of:
 —$(CH_2)_eCH_3$;
 $CH_3(CH_2)_7CH=CH(CH_2)_7$—;
 $CH_3$—$(CH_2)_4$—$CH=CH$—$CH_2$—$CH=CH$—$(CH_2)_7$—
 and mixtures thereof;
 e is an integer ranging from 6 to 12;
and
 iii. pentaerythritol esters conforming to the following structure;

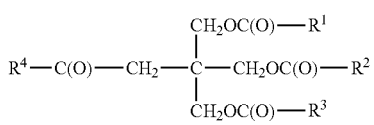

wherein;
 $R^1$, $R^2$, $R^3$ and $R^4$ are independently selected from the group consisting of:
 —$(CH_2)_eCH_3$;
 $CH_3(CH_2)_7CH=CH(CH_2)_7$—;
 $CH_3$—$(CH_2)_4$—$CH=CH$—$CH_2$—$CH=CH$—$(CH_2)_7$—
 and mixtures thereof;
 e is an integer ranging from 6 to 12;
 iv. and mixtures thereof;
wherein said esters have melting points of below 25° C.

We have fond that the compositions of the present invention liquefy under pressure of the finger, spread well no the skin and provide an excellent cosmetic feel. In instances where delivery is desired, the active is added. The actives include sunscreen actives, hydroxy acids, antioxidants, flavonoids, tocopherol, vitamins and the like.

The present invention is also directed to a process for treating skin with a composition comprising contacting the skin with an effective conditioning concentration of a composition, which comprises;

A. an ester conforming to

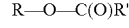

Wherein:
R is alkyl having 30 to 50 carbon atoms;
R is alkyl having 17 to 21 carbon atoms;
and
B. a liquid ester selected from the group consisting of
 i. glyceryl esters conforming to the following structure;

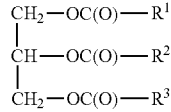

wherein;
 $R^1$, $R^2$ and $R^3$ are independently selected from the group consisting of:
 —$(CH_2)_eCH_3$,
 $CH_3(CH_2)_7CH=CH(CH_2)_7$—;
 $CH_3$—$(CH_2)_4$—$CH=CH$—$CH_2$—$CH=CH$—$(CH_2)_7$—
 and mixtures thereof;
 e is an integer ranging from 5 to 11;
 ii. trimethylolpropane esters conforming to the following structure;

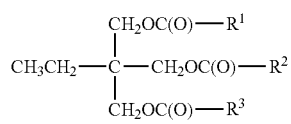

wherein;
 $R^1$, $R^2$ and $R^3$ are independently selected from the group consisting of:
 —$(CH_2)_eCH_3$;
 $CH_3(CH_2)_7CH=CH(CH_2)_7$—;
 $CH_3$—$(CH_2)_4$—$CH=CH$—$CH_2$—$CH=CH$—$(CH_2)_7$—
 and mixtures thereof;
 e is an integer ranging from 6 to 12;
and
 iii. pentaerythritol esters conforming to the following structure;

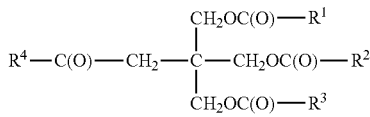

wherein;
R$^1$, R$^2$, R$^3$ and R$^4$ are independently selected from the group consisting of:
—(CH$_2$)$_e$CH$_3$;
CH$_3$(CH$_2$)$_7$CH═CH(CH$_2$)$_7$—;
CH$_3$—(CH$_2$)$_4$—CH═CH—CH$_2$—CH═CH—(CH$_2$)$_7$—
and mixtures thereof;
e is an integer ranging from 6 to 12;
iv. and mixtures thereof;
wherein said esters have melting points of below 25° C. and
(c) optionally sun screen actives, hydroxy acids, antioxidants, flavonoids, tocopherol, and vitamins.

Preferred Embodiments

In a preferred embodiment the liquid ester is a glyceryl ester conforming to the following structure;

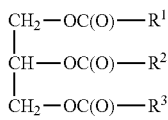

wherein;
R$^1$, R$^2$ and R$^3$ are independently selected from the group consisting of:
—(CH$_2$)$_e$CH$_3$;
CH$_3$(CH$_2$)$_7$CH═CH(CH$_2$)$_7$—;
CH$_3$—(CH$_2$)$_4$—CH═CH—CH$_2$—CH═CH—(CH$_2$)$_7$—
and mixtures thereof;
e is an integer ranging from 5 to 11.

In another preferred embodiment the liquid ester is a trimethylolpropane esters conforming to the following structure;

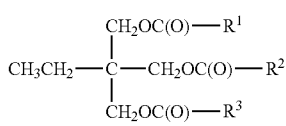

wherein;
R$^1$, R$^2$ and R$^3$ are independently selected from the group consisting of:
—(CH$_2$)$_e$CH$_3$;
CH$_3$(CH$_2$)$_7$CH═CH(CH$_2$)$_7$—;
CH$_3$—(CH$_2$)$_4$—CH═CH—CH$_2$—CH═CH—(CH$_2$)$_7$—
and mixtures thereof;
e is an integer ranging from 6 to 12.

In another preferred embodiment the liquid ester is a pentaerythritol esters conforming to the following structure;

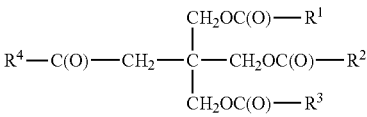

wherein;
R$^1$, R$^2$, R$^3$ and R$^4$ are independently selected from the group consisting of:
—(CH$_2$)$_e$CH$_3$;
CH$_3$(CH$_2$)$_7$CH═CH(CH$_2$)$_7$—;
CH$_3$—(CH$_2$)$_4$—CH═CH—CH$_2$—CH═CH—(CH$_2$)$_7$—
and mixtures thereof;
e is an integer ranging from 6 to 12.

In a most preferred embodiment the liquid ester is mixtures of glyceryl esters, trimethylolpropane esters and pentaerythritol esters.

In a preferred embodiment the percentage of solid ester ranges from 1 to 10% by weight. (The ester ranges from 99 to 90% respectively).

In a more preferred embodiment the percentage of solid ester ranges from 1 to 5% by weight. (The ester ranges from 95 to 85% respectively).

EXAMPLES

The solid esters used in the composition of the present invention conform to the following structure:

R—O—C(O)R' wherein:
R is alkyl having 30 to 50 carbon atoms;
R' is alkyl having 17 to 21 carbon atoms.
They are made by the following reaction:

ROH+R'COOH→R—O—C(O)R'+H$_2$O

Fatty Alcohols
The alcohols useful in making the esters of the present invention conform to the following structure:

ROH wherein
R is alkyl having 30 to 50 carbon atoms;
In a preferred embodiment the alcohols are UNILIN™ alcohols. Unilin is a trademark of UNILIN is a trademark of Baker Hughes Incorporated.
Baker Hughes defines the alcohols as "based on proprietary technology, UNILIN™ Alcohols are fully saturated, long chain, linear primary alcohols. Compared to other commercially available synthetic alcohols, UNILIN Alcohols are of higher molecular weight, greater crystallinity, and higher purity with an 80% primary alcohol concentration."
Baker Hughes continues "Linear alcohols are traditionally limited to C30 and lower, while UNILIN Alcohols are available with average carbon chain lengths up to C50. A further attractive feature of the UNILIN Alcohols is the relatively narrow 1.1 polydispersity (Mw/Mn)."

| Example | R Value* | Trade Name | OH Value** | Molecular Weight*** |
|---|---|---|---|---|
| 1 | C30H61 | Unilin 350 | 128.4 | 437 |
| 2 | C39H79 | Unilin 425 | 99.7 | 563 |

-continued

| Example | R Value* | Trade Name | OH Value** | Molecular Weight*** |
|---|---|---|---|---|
| 3 | C47H95 | Unilin 550 | 83.1 | 675 |
| 4 | C60H21 | Unilin 700 | 65.5 | 857 |

*Calculated (Molecular weight −16)/14
*Measured.
**Calculated (56110/OH Value)

The molecular weight is calculated from the hydroxyl value and the R-value from the molecular weight. The Tradename is not given merely for reference.

Fatty Acids

The fatty acids of the present invention are commercially available from several commercial sources including Cognis. They conform to the following structure:

R'COOH

R' is alkyl having 17 to 21 carbon atoms.

| Example | R' | Common name |
|---|---|---|
| 5 | C17H35 | Stearic Acid |
| 6 | C19H39 | Arachidic acid |
| 7 | C21H43 | Behenic Acid |

Esterification Process
General Procedure

To a round bottom flask equipped with thermometer, agitation and nitrogen sparge is added the specified number of grams of alcohol (Example 1-4). Next the specified number of grams of the specified acid (example 5-7) is added. Next add 0.1% by weight of both the alcohol and acid of stannous oxylate. The temperature is increased to 170-190° C. for eight hours, water is generated and distilled off. The reaction is stopped when the water ceases to come off.

|  | Alcohol | | Fatty Acid | |
|---|---|---|---|---|
| Example | Example | Grams | Example | Grams |
| 8 | 1 | 437 | 5 | 282 |
| 9 | 2 | 563 | 6 | 296 |
| 10 | 3 | 675 | 7 | 324 |
| 11 | 4 | 857 | 5 | 282 |
| 12 | 1 | 437 | 6 | 296 |
| 13 | 4 | 536 | 7 | 324 |

Liquid Esters

Example 14-20—Glyceryl esters are commercially available from a variety of manufacturers including SurfaTech Corporation sold under the Cosmosurf trade name. Glyceryl esters conform to the following structure;

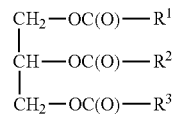

wherein;
R$^1$, R$^2$ and R$^3$ are independently selected from the group consisting of:
—(CH$_2$)$_e$CH$_3$;
CH$_3$(CH$_2$)$_7$CH═CH(CH$_2$)$_7$—;
CH$_3$—(CH$_2$)$_4$—CH═CH—CH$_2$—CH═CH—(CH$_2$)$_7$—
and mixtures thereof;
e is an integer ranging from 5 to 11;

Examples 14-20

| Example | R$^1$ | R$^2$ | R$^3$ |
|---|---|---|---|
| 14 | CH$_3$(CH$_2$)$_7$CH═CH(CH$_2$)$_7$— | —(CH$_2$)$_6$CH$_3$ | —(CH$_2$)$_{11}$CH$_3$; |
| 15 | CH$_3$(CH$_2$)$_7$CH═CH(CH$_2$)$_7$— | —(CH$_2$)$_7$CH$_3$ | —(CH$_2$)$_9$CH$_3$ |
| 16 | —(CH$_2$)$_7$CH$_3$ | —(CH$_2$)$_7$CH$_3$; | —(CH$_2$)$_7$CH$_3$ |
| 17 | —(CH$_2$)$_7$CH$_3$ | —(CH$_2$)$_9$CH$_3$ | —(CH$_2$)$_7$CH$_3$ |
| 18 | —(CH$_2$)$_{11}$CH$_3$ | —(CH$_2$)$_{11}$CH$_3$ | —(CH$_2$)$_9$CH$_3$ |
| 19 | CH$_3$(CH$_2$)$_7$CH═CH(CH$_2$) | CH$_3$(CH$_2$)$_7$CH═CH(CH$_2$) | CH$_3$(CH$_2$)$_7$CH═CH(CH$_2$) |
| 20 | CH$_3$—(CH$_2$)$_4$—CH═CH—CH$_2$—CH═CH—(CH$_2$)$_7$— | CH$_3$—(CH$_2$)$_4$—CH═CH—CH$_2$—CH═CH—(CH$_2$)$_7$— | —(CH$_2$)$_{11}$CH$_3$ |

Example 21-39—Trimethylolpropane esters are commercially available from a variety of manufacturers including SurfaTech Corporation sold under the Cosmosurf trade name, and conform to the following structure conforming to the following structure;

Examples

| Example | R$^1$ | R$^2$ | R$^3$ |
|---|---|---|---|
| 21 | CH$_3$(CH$_2$)$_7$CH═CH(CH$_2$)$_7$— | —(CH$_2$)$_6$CH$_3$ | —(CH$_2$)$_{11}$CH$_3$ |
| 22 | CH$_3$(CH$_2$)$_7$CH═CH(CH$_2$)$_7$— | —(CH$_2$)$_7$CH$_3$ | —(CH$_2$)$_9$CH$_3$; |
| 23 | —(CH$_2$)$_7$CH$_3$ | —(CH$_2$)$_7$CH$_3$; | —(CH$_2$)$_7$CH$_3$; |
| 24 | —(CH$_2$)$_7$CH$_3$ | —(CH$_2$)$_9$CH$_3$ | —(CH$_2$)$_7$CH$_3$; |
| 25 | —(CH$_2$)$_{11}$CH$_3$ | —(CH$_2$)$_{11}$CH$_3$ | —(CH$_2$)$_{11}$CH$_3$ |
| 26 | CH$_3$(CH$_2$)$_7$CH═CH(CH$_2$) | CH$_3$(CH$_2$)$_7$CH═CH(CH$_2$) | CH$_3$(CH$_2$)$_7$CH═CH(CH$_2$) |
| 27 | CH$_3$—(CH$_2$)$_4$—CH═CH—CH$_2$—CH═CH—(CH$_2$)$_7$— | CH$_3$—(CH$_2$)$_4$—CH═CH—CH$_2$—CH═CH—(CH$_2$)$_7$— | —(CH$_2$)$_{11}$CH$_3$ |

Example 28-34 Penterythrtol esters are commercially available from a variety of manufacturers including SurfaTech Corporation sold under the Cosmosurf trade name, and conform to the following structure conforming to the following structure

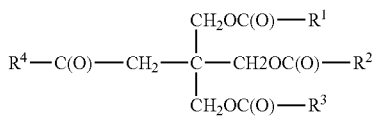

wherein;
$R^1$, $R^2$, $R^3$ and $R^4$ are independently selected from the group consisting of:
—$(CH_2)_eCH_3$;
$CH_3(CH_2)_7CH=CH(CH_2)_7$—;
$CH_3$—$(CH_2)_4$—$CH=CH$—$CH_2$—$CH=CH$—$(CH_2)_7$—
and mixtures thereof;
e is an integer ranging from 6 to 12;

Examples 28-34

| Example | $R^1$ | $R^2$ |
|---|---|---|
| 28 | $CH_3(CH_2)_7CH=CH(CH_2)_7$— | —$(CH_2)_6CH_3$ |
| 29 | $CH_3(CH_2)_7CH=CH(CH_2)_7$— | —$(CH_2)_7CH_3$ |
| 30 | —$(CH_2)_7CH_3$ | —$(CH_2)_7CH_3$; |
| 31 | —$(CH_2)_7CH_3$ | —$(CH_2)_9CH_3$ |
| 32 | —$(CH_2)_{11}CH_3$ | —$(CH_2)_{11}CH$ |
| 33 | $CH_3(CH_2)_7CH=CH(CH_2)$ | $CH_3(CH_2)_7CH=CH(CH_2)$ |
| 34 | $CH_3$—$(CH_2)_4$—$CH=CH$—$CH_2$—$CH=CH$—$(CH_2)_7$— | $CH_3$—$(CH_2)_4$—$CH=CH$—$CH_2$—$CH=CH$—$(CH_2)_7$— |

| Example | $R^3$ | $R^4$ |
|---|---|---|
| 28 | —$(CH_2)_{11}CH_3$ | —$(CH_2)_{11}CH_3$ |
| 29 | —$(CH_2)_9CH_3$ | —$(CH_2)_{11}CH_3$ |
| 30 | —$(CH_2)_7CH_3$ | —$(CH_2)_7CH_3$ |
| 31 | —$(CH_2)_7CH_3$ | —$(CH_2)_{11}CH_3$ |
| 32 | —$(CH_2)_7CH_3$ | —$(CH_2)_{11}CH_3$ |
| 33 | $CH_3(CH_2)_7CH=CH(CH_2)$ | —$(CH_2)_{11}CH_3$ |
| 34 | —$(CH_2)_{11}CH_3$ | —$(CH_2)_{11}CH_3$ |

Example 35-42—Mixtures of glyceryl esters, trimethylolpropane esters, and pentaerythritol esters.

Examples 35-42

| | Glyceryl Ester | | Trimethylolpropane Ester | | Pentaerythritol Ester | |
|---|---|---|---|---|---|---|
| Example | Example | Grams | Example | Grams | Example | Grams |
| 35 | 25 | 0 | 33 | 10 | 40 | 100 |
| 36 | 26 | 100 | 34 | 5 | 41 | 50 |
| 37 | 27 | 100 | 35 | 1 | 44 | 50 |
| 38 | 28 | 100 | 36 | 100 | 43 | 100 |
| 39 | 29 | 100 | 37 | 500 | 44 | 1 |
| 40 | 30 | 100 | 38 | 1000 | 45 | 0 |
| 41 | 31 | 100 | 39 | 500 | 46 | 1 |
| 42 | 32 | 100 | 33 | 0 | 40 | 50 |

Products Of the Present Invention

To the specified number of grams of the specified ester (Example 14 to 42) is added the specified number of grams of the specified solid ester (Example 8-13). The mixture is heated to 80° C., until clear. The mixture is agitated 30 minutes then cooled. The soft solid is formed as the mixture cools. Optional additives are added while hot.

| | Solid Ester | | Liquid Ester | |
|---|---|---|---|---|
| Example | Example | Grams | Example | Grams |
| 43 | 8 | 1 | 14 | 99 |
| 44 | 9 | 5 | 15 | 95 |
| 45 | 10 | 10 | 16 | 90 |
| 46 | 11 | 15 | 17 | 85 |
| 47 | 12 | 20 | 18 | 80 |
| 48 | 13 | 1 | 18 | 99 |
| 49 | 8 | 5 | 20 | 95 |
| 50 | 9 | 10 | 21 | 90 |
| 51 | 10 | 15 | 22 | 85 |
| 52 | 11 | 20 | 23 | 80 |
| 53 | 12 | 1 | 24 | 99 |
| 54 | 13 | 2 | 25 | 98 |
| 55 | 13 | 5 | 26 | 95 |
| 56 | 12 | 10 | 27 | 90 |
| 57 | 11 | 15 | 28 | 85 |
| 58 | 10 | 20 | 29 | 80 |
| 59 | 9 | 1 | 30 | 99 |

-continued

| | Solid Ester | | Liquid Ester | |
|---|---|---|---|---|
| Example | Example | Grams | Example | Grams |
| 60 | 8 | 3 | 31 | 97 |
| 61 | 13 | 7 | 32 | 93 |
| 62 | 13 | 12 | 33 | 88 |
| 63 | 12 | 15 | 34 | 85 |
| 64 | 11 | 18 | 35 | 89 |
| 65 | 10 | 20 | 36 | 80 |
| 66 | 9 | 1 | 37 | 99 |
| 67 | 8 | 5 | 38 | 95 |
| 68 | 8 | 10 | 38 | 90 |
| 69 | 9 | 15 | 40 | 85 |
| 70 | 10 | 20 | 41 | 80 |
| 71 | 11 | 1 | 42 | 99 |

Applications Examples

The compositions of the present invention are soft solids. The lower percentages of solid ester (1-5% by weight), the softer the solid. They liquefy upon the touch and spread rapidly on the skin. At ranges of between 5 and 10% by weight added liquid ester, the compositions are rigid but still yield under pressure. The cushion is better. By cushion is meant the thickness of the liquid under the finger while spreading. The amount of time necessary to spread out the composition is the play time. The intermediate level of between 5 and 10% by weight have short play times, spreading out rapidly. At levels of between 10 and 20% by weight the gel is very rigid and the play time is extended. This allows the formulation of products that have wide cosmetic applications, allowing the formulator wide latitude to develop a product that meets consumer expectations.

The higher the number of carbon atoms in the solid ester, the higher the melting point of the composition. At the melt point the structured gel dissolves making a liquid, upon cooling the structured gel reforms, making the technology very flexible.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

The invention claimed is:

1. An ester conforming to the following structure:

R—O—C(O)R' wherein:
R is alkyl having 30 to 50 carbon atoms and having a narrow polydispersity of around 1.1;
R is alkyl having 17 to 21 carbon atoms.

2. An ester of claim 1 wherein R is alkyl having 17 carbon atoms.

3. An ester of claim 1 wherein R is alkyl having 19 carbon atoms.

4. An ester of claim 1 wherein R is alkyl having 21 carbon atoms.

5. An ester conforming to the following structure:

R—O—C(O)R' wherein:
R is alkyl having 30 to 50 carbon atoms and having a narrow polydispersity of around 1.1;
R' is alkyl having 17 to 21 carbon atoms.

6. An ester of claim 5 wherein R is alkyl having 17 carbon atoms.

7. An ester of claim 5 wherein R is alkyl having 19 carbon atoms.

8. An ester of claim 5 wherein R is alkyl having 21 carbon atoms.

9. An ester of claim 5 wherein R' is alkyl having 30 carbon atoms.

10. An ester of claim 5 wherein R' is alkyl having 39 carbon atoms.

11. An ester of claim 5 wherein R' is alkyl having 60 carbon atoms.

* * * * *